July 29, 1941.  R. A. WITTMANN  2,250,738
TEMPERATURE ACTUATED SAFETY SYSTEM
Filed March 24, 1938  3 Sheets-Sheet 1

Inventor
Robert A. Wittmann
By Brown Jackson Boettcher Dienner
Attys.

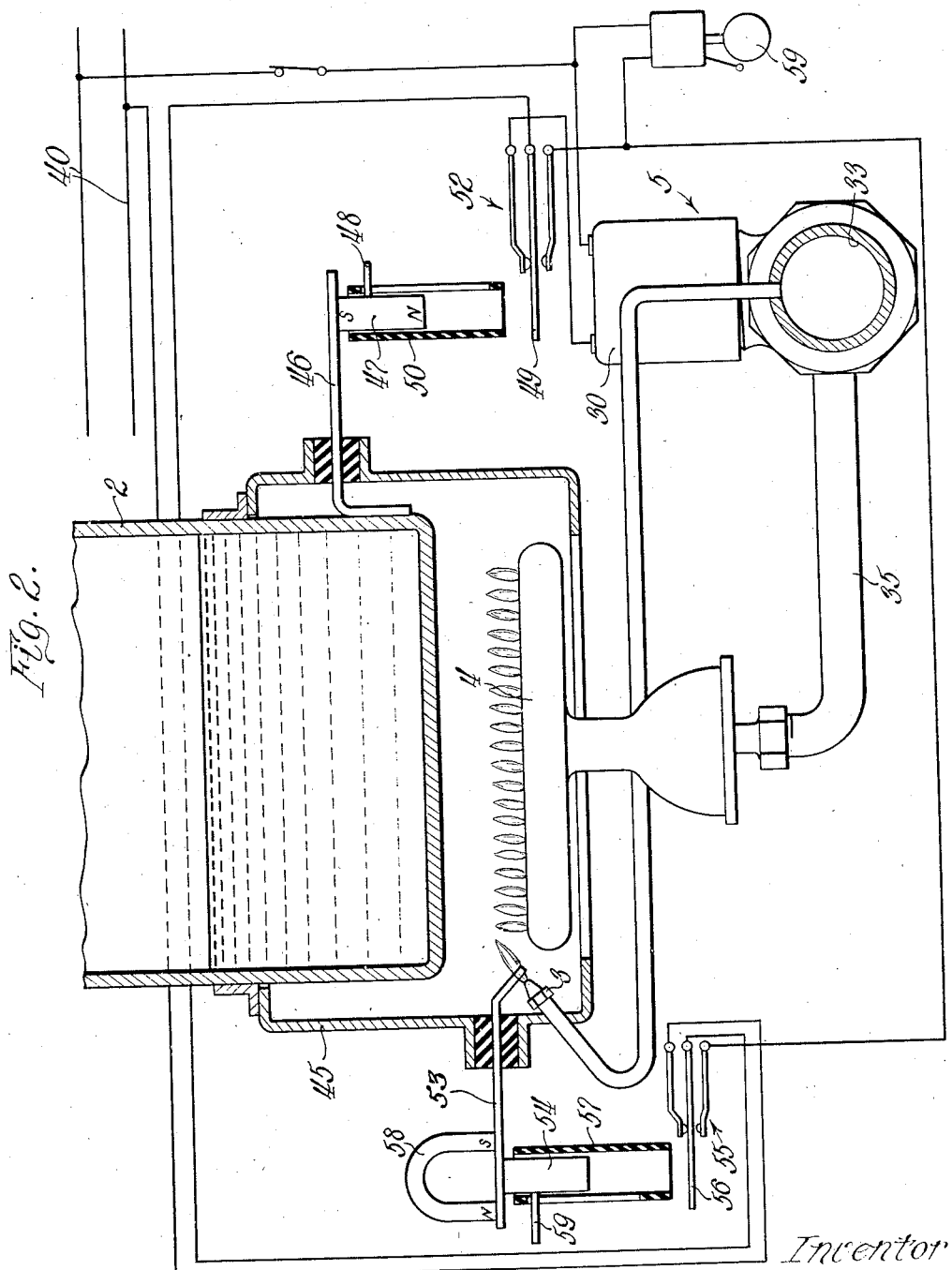

July 29, 1941. R. A. WITTMANN 2,250,738
TEMPERATURE ACTUATED SAFETY SYSTEM
Filed March 24, 1938 3 Sheets-Sheet 3
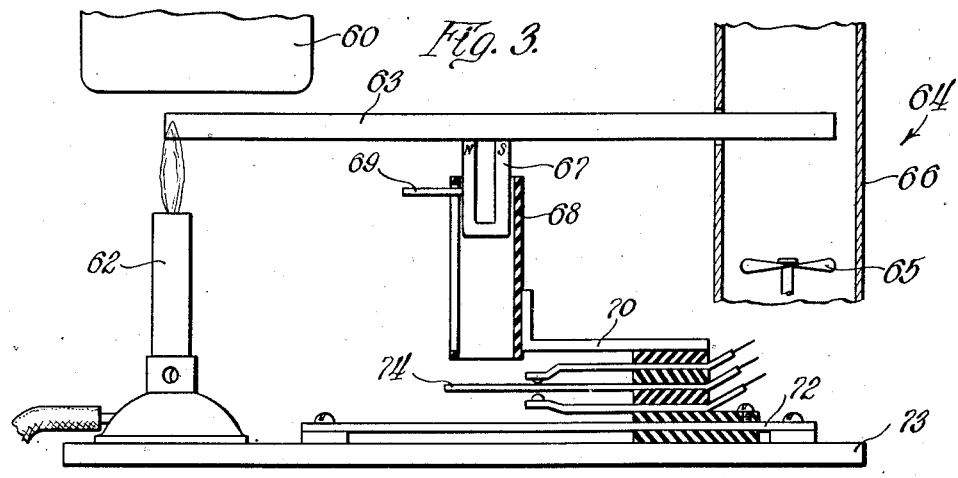
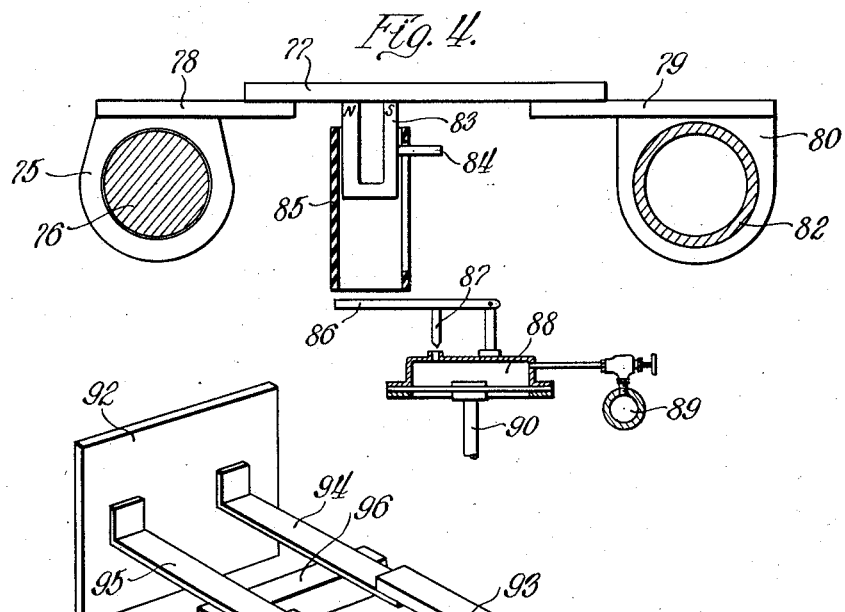
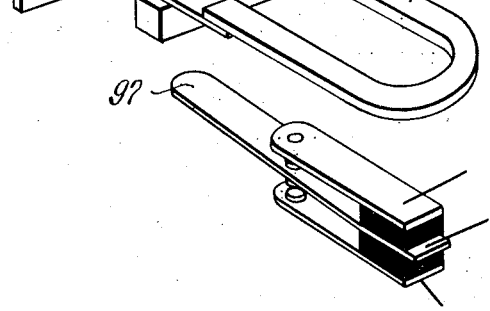
Inventor
Robert A. Wittmann
By Brown, Jackson, Boettcher & Dienner
Attys.

Patented July 29, 1941

2,250,738

UNITED STATES PATENT OFFICE 2,250,738

TEMPERATURE ACTUATED SAFETY SYSTEM

Robert A. Wittmann, Chicago, Ill., assignor to Chicago By-Products Corporation, a corporation of Illinois Application March 24, 1938, Serial No. 197,773

14 Claims. (Cl. 158—117.1)

My present invention relates, generally, to temperature actuated safety systems. A system will be described, by way of illustration, which is actuated by the temperatures of a gas pilot and a portion of a boiler which it is desired to protect from overheating. However, it will be apparent, as pointed out hereafter in the description, that the system may be actuated by other temperatures.

In Figure 1 of my copending application, Serial No. 189,120, filed February 7, 1938, I have shown a safety pilot system which operates upon the principle of employing ferro-magnetic material having a suitable Curie point. In the illustration of one form of my temperature actuated safety system, given hereafter, I use this same safety pilot system of my aforesaid copending application, in combination with a limit switch hereinafter described.

In order to more fully understand my application of Curie point material it may be well to comment briefly on its operation. As is well known, there are many metals and alloys having ferro-magnetic properties to varying degrees. These metals and alloys may or may not contain iron. Upon heating one of these metals or alloys, which has ferro-magnetic properties, a temperature is reached at which its ferro-magnetic properties disappear. This temperature is technically known as the Curie point of the metal or alloy. When one of these metals or alloys is at a temperature above its Curie point it is said to be para-magnetic, since it does not possess the ferro-magnetic properties which it has at ordinary temperatures. Upon cooling a material in the para-magnetic condition it will regain its the ferro-magnetic properties. Since each ferro-magnetic metal or alloy has a different Curie point, this permits selection of different materials, depending on different conditions.

The principal object of my invention is to provide an automatic safety system comprising two temperature responsive ferro-magnetic elements and which system will automatically put into effect certain safety measures according to temperature changes of the two temperature responsive ferro-magnetic elements.

Another object of my invention is to provide a temperature actuated safety system wherein there are no fuses or fusible plugs, which necessitate replacement, thus eliminating the cost and time of replacing them.

Another object of my invention is to provide a temperature actuated safety system that is capable of easy and simple adjustment to various conditions after it has been installed.

Another object of my invention is to provide a temperature actuated safety system which is very durable and reliable in operation, because of its mechanical simplicity and permanence.

A valuable characteristic of the present invention is its permanence and reliability. A permanent magnet is, in each case, employed as the means cooperating with the Curie point material to produce mechanical motion upon the attainment of a predetermined temperature. In my system, the permanent magnet is not directly subjected to the heat to which the Curie point material is subjected. Hence its magnetic properties are not impaired or destroyed even by long continued operation. In one form of my invention the permanent magnet is suspended by its attraction to the Curie point material, and as soon as the Curie point element attains substantially the Curie point temperature, the magnet drops away from and is physically separated from the heated element. This permits it to become completely separated from the source of heat, and even if the Curie point material should be heated to an excessive temperature by heat conduction from a hot part after the magnet has dropped away, the magnet is not subjected to that excessive temperature, and hence it is never likely to become demagnetized. This is an important practical advantage.

A still further object of my invention is to provide a temperature actuated safety system which is compact and simple, from an assembly viewpoint, inexpensive to manufacture, and substantially universal in application.

Now in order to acquaint those skilled in the art with the manner of constructing and operating a device embodying my invention, I shall describe, in conjunction with the accompanying drawings, a specific embodiment of the invention and a method of operation of the same.

In the accompanying drawings, Figure 1 shows a diagram of my temperature actuated safety system applied to a gas boiler installation.

Figure 2 is a diagram of a modification of the system shown in Figure 1.

Figure 3 is a diagram of a further modification.

Figure 4 is a diagram of a safety system of my invention applied to the protection of a mechanical bearing, and Figure 5 is a diagrammatic view of another embodiment of my invention.

Figure 1:
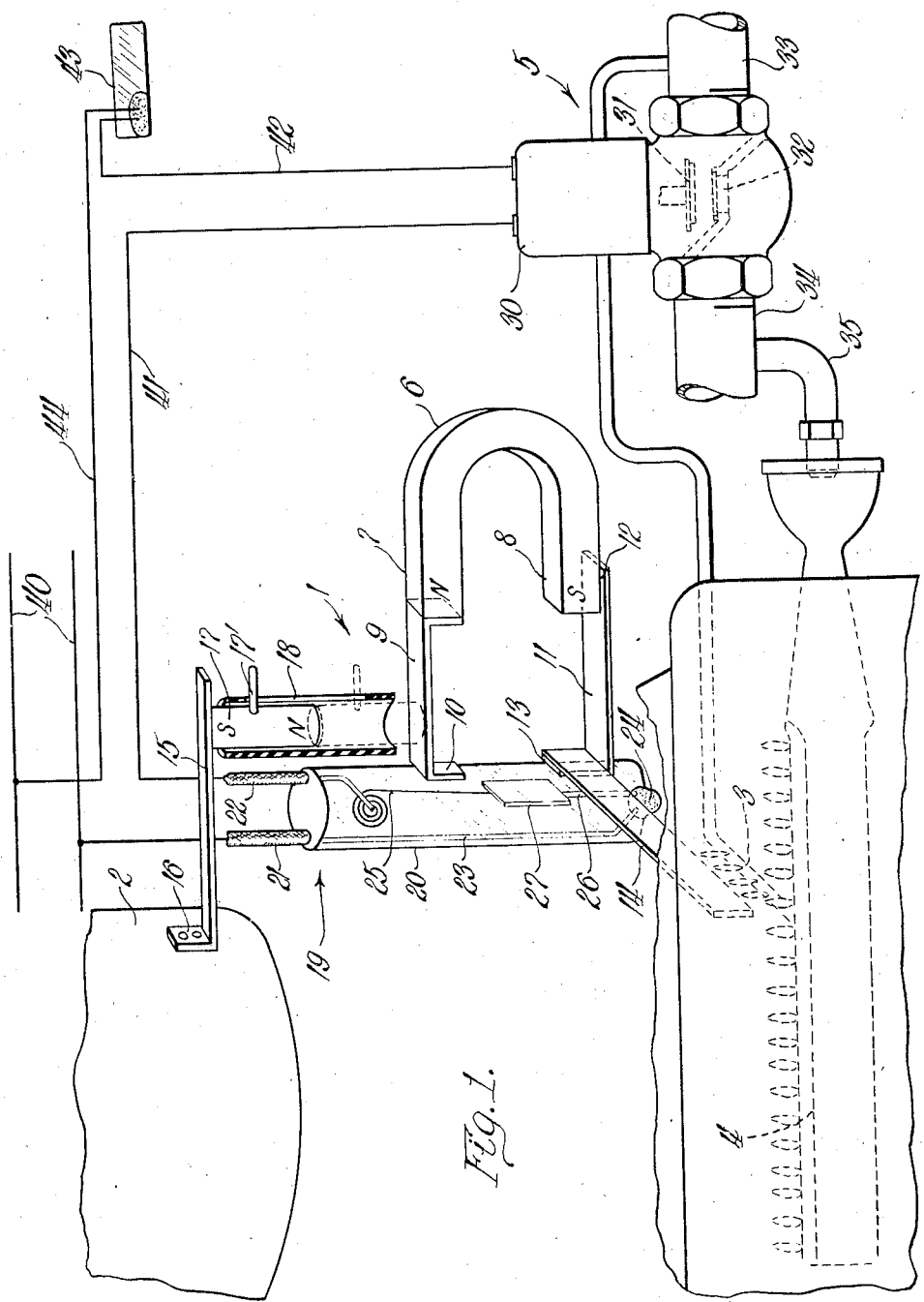

In Figure 1, reference character 1 designates, generally, the temperature actuated control mechanism of my safety system, which is responsive to the temperatures of the boiler portion 2, and the gas pilot 3 which is positioned to light the gas burner 4. Gas is fed to the burner 4 from the valve mechanism, shown generally at 5, which is controlled electrically by the safety mechanism 1.

Referring now to the safety mechanism shown, generally, at 1, a permanent magnet 6 is shown with upper and lower poles 7 and 8, respectively, having the polarities as indicated thereon. The permanent magnet 6 may be replaced by an electromagnet and the poles 7 and 8 interchanged without change in operation. To the upper pole 7 a pole extension 9 of ferro-magnetic material is attached as shown. The pole extension 9 preferably has a Curie point somewhat above the normal ambient temperature in which it is disposed for operation. At the end of the pole extension 8, away from the pole 7, is formed the end portion 10 which is substantially parallel to the end surface of the pole 7.

The lower pole 8 has disposed adjacent thereto a pole extension 11, the adjacent end of which is spaced from the lower pole 8 by a short air gap 12. At the end of the pole extension 11, away from the pole 8, is formed the end portion 13, similar to the end portion 10 of the upper pole extension 9. The air gap 12 is to avoid the transmission of heat by conduction from the pole extension 11 to the pole 8.

The pole extension 11, like pole extension 9, is made of a suitable Curie point ferro-magnetic material, selected so that its Curie point lies above the normal ambient temperature of the medium in which it is disposed for operation. This permits it to lose heat to the surrounding medium in order to maintain its temperature below the Curie point, and hence to retain normally its ferro-magnetic properties. The pole extensions 9 and 11 may or may not be of the same composition.

To the end portion 13 is attached one end of a strip 14 of metal, the other end of which is positioned over the flame of the gas pilot 3. The strip 14 conducts the heat of the gas pilot, when burning, to the pole extension 11 to maintain it above the Curie point.

With a view to providing a temperature responsive element which is operated in accordance with the temperature of boiler portion 2, I mount thereon or in thermally coupled relation thereto an element 15 consisting in whole or in part of suitable Curie point material. The member 15 projects over the pole extension 9, as shown in the diagram. While I have herein shown the thermally responsive strip 15 as in contact with and supported by the boiler 2 or other heat receiving element, this is not necessary. It may be attached to any suitable support and may extend along the surface of the boiler or other heat receiving member in such thermal relation to the boiler, pan or other heated device 2 that it will not be heated above the Curie point unless the boiler 2 is heated above a dangerous temperature.

The heat transmitting member 15 has a definite ratio of temperature with respect to the heated vessel 2, because it is normally subject to receive heat from the fire of the burner 4 and to lose heat to the member 2. Hence, if the member 2 rises in temperature, it will no longer be able to receive heat as readily from the strip 15 and the temperature of the strip 15 rises above the Curie point when the vessel or heated member rises to a dangerous temperature. The strip 15 or a like heat receiving member may be located at any convenient point in the normal temperature gradient between the burner and the heated object 2. Then if the gradient changes, the absolute temperature of the strip 15 or its equivalent is changed, producing the desired effect of causing magnet 17 to drop or otherwise change its position or action.

The strip 15 or its equivalent, i. e., a heat conducting member and a Curie point material (either as separate parts, or the two functions combined in the same material) may be employed in situations other than in the temperature gradient between the fire and the heated member in boiler 2. For example, it may be heated from and control the temperature of the air to or from the burner. It may be made responsive to flue gas temperature, or crown sheet temperature, or the temperature of a metal bearing or any other device or element or fluid where a definite temperature limit should be imposed for the sake of safety or other desired purpose. In each instance, the device is subject to the temperature of the controlling device or fluid, and it is so constructed or arranged to dissipate heat. When the accumulation of heat faster than dissipation carries the temperature of the material above the Curie point, the magnet 17 will change position and cause an operation in response.

A permanent magnet 17 is disposed between the pole extension 9 and the member 15. As indicated, the polarity of the lower end of permanent magnet 17 is the same as that of the adjacent pole 7 of the permanent magnet 6. The guide 18 is also disposed between the pole extension 9 and member 15 in order to guide the permanent magnet 17 in its movement. The magnet 17 is provided with a restoring handle 17' for raising the magnet 17 into operative relation to the strip 15 to be held thereby when the strip 15 has regained its ferro-magnetic properties.

The temperature responsive apparatus just described is used to operate a control switch shown, generally at 19. The details of the control switch may be varied, but I shall describe the preferred form. The control switch 19 comprises a glass container 20 with a pair of sealed inleads 21 and 22. The inlead 21 continues as a conductor 23 to the bottom of the glass container 20, where, in a suitably formed depression of the container 20, there is deposited a pool 24 of mercury in which the conductor 23 is at all times immersed. The inlead 22 is connected to a coil spring conductor 25 which normally holds the lower or contact end 26 immersed in the pool 24 of mercury. This conductor 25 also carries a magnetic armature 27 which, when attracted toward the adjacent wall of the container, causes the lower contact end 26 to leave the mercury pool 24 and thereby break electrical contact with it to open the circuit between inleads 21 and 22. While an enclosed switch is preferable, an open switch may be used if desired.

The gas feed valve 5 is operated by an electromagnet 30, which, while energized, holds the valve member 31 off the port 32, whereby gas may flow from the gas main 33, through the port 32, to the gas pipe 34, and into the gas burner 4 through the burner supply pipe 35. When the electromagnet 30 is deenergized the valve member 31 will cover the port 32 and shut off the supply of gas to the burner 4.

A supply of current suitable to operate the electromagnet 30 may be secured through the conductors 40. When the switch 19 is closed, current will flow through the following circuit: lower conductor 40, inlead 21, conductor 23, mercury pool 24, coil spring conductor 25, inlead 22, conductor 41, coil of the electromagnet 30, conductor 42, mercury switch 43, and conductor 44 to the upper conductor 40. The mercury switch 43 may be made responsive to some other desired control condition, such as room temperature, if desired. This illustrates the fact that the present control may be combined with other controls for shutting off the valve 5.

The operation of the system illustrated in Figure 1 is as follows: Assume the pilot 3 to be lighted. The permanent magnet 6 will normally furnish enough flux between the end portions 10 and 13 to attract the armature 27 sufficiently that the lower contact end 26 is held out of contact with the mercury pool 24. However, if the pole extension 11 is heated above its Curie point and thus becomes practically non-magnetic, the density of the flux between end portions 10 and 13 will be substantially decreased and the armature 27 will not be attracted sufficiently to cause the lower contact end 26 to break contact with the mercury pool 24. Now when the pilot 3 is burning, as has been assumed, it will heat the strip 14 which will conduct the heat to the end portion 13 of the pole extension 11, thereby causing the temperature of the pole extension 11 to be raised above its Curie point and become para-magnetic. When the pole extension 11 assumes this condition, it will be practically non-magnetic and the flux density between end portions 10 and 13 will not be sufficient to attract the armature 27. Hence, the switch 19 will be closed and the electromagnet 30 energized, and gas will flow to the burner 4. If, however, the pilot 3 should not be lighted, or should go out, the pole extension 11 will not be heated above its Curie point, or if heated quickly cools off and will not be para-magnetic but ferro-magnetic. Consequently, the flux from permanent magnet 6 will be fully available to attract the armature 27, and the switch 19 will open. As a result, the electromagnet 30 will be deenergized, and the gas port 32 will be closed, shutting off the gas supply to the burner 4. Thus, there will never be gas flowing to the burner 4 when the pilot 3 is not burning.

Referring now to that part of the system which is controlled by the temperature of the boiler or heated device 2 which it is desired to protect from overheating, the temperature of the ferro-magnetic member 15 is made to be dependent on the temperature of the boiler portion 2. The member 15 is of such length and of such Curie point that the heat normally conducted to it from the boiler portion 2 will be dissipated sufficiently to keep the temperature of the end with which the magnet 17 cooperates below its Curie point. A separate heat conducting portion and a portion of Curie point material as is the case in connection with the polar extension 11 and heat conducting members 14 may be employed. The member 15 will, so long as the boiler 2 is below a dangerous temperature, be ferro-magnetic and attract and hold the permanent magnet 17 to it. Now, when the boiler portion 2 rises above a certain predetermined temperature, the heat conducted to member 15 will not be dissipated rapidly enough to keep its temperature from rising above its Curie point and it will become para-magnetic. When it changes to the para-magnetic state, it will no longer attract and hold the magnet 17. The magnet 17 drops through the guide 18 onto the pole extension 9. As the lower pole of magnet 17 has the same polarity as pole 7, the intensity of the flux in the end of the pole extension 9 will be increased. Hence the armature 27 will be attracted by a sufficient force to withdraw the lower contact end 26 from pool 24 of mercury and thereby open switch 19 and shut off the gas supply to the burner 4, in the manner previously described, thereby allowing the boiler portion 2 to cool. When the boiler portion 2 cools to a safe temperature the member 15 will cool and again become ferro-magnetic, and be capable of exerting an attraction for permanent magnet 17.

The permanent magnet 17 may be raised into contact with strip 15 by means of the handle 17'. If the boiler 2 and the strip 15 have not cooled off sufficiently, the magnet 17 will not stick. Hence it serves as an indication of when the heated device has cooled off to a safe value. When the permanent magnet 17 is restored to its upper position, the flux intensity in the end portion 11 will decrease to normal and the switch 19 will close, thereby allowing gas to flow to the burner 4 and heat the boiler 4 in the manner previously described.

The strip 15 or its equivalent may be subjected to a dual influence. For example, it may be subjected to the heat of the fire and cooled off by the heat receiving device 2 as a priming action to control adhesion of the magnet 17. It may be however so arranged that additional cooling is normally provided, as for example by a flow of air to the burner or to some part of the apparatus, or by cooling fluid, as for example the water cooling system of an engine or a compressor or the like. Then in the event that the fluid flow should be interrupted, interfered with, or become abnormal, so that it would not exercise the desired cooling effect, the temperature of the strip 15 will rise and the magnet 17 lose its attraction or other desired effect responsive to the attainment of the Curie point in the strip 15.

I have described, above, a simple and practical temperature actuated safety system. Sufficient information has been given whereby one skilled in this art can apply this system to a wide variety of conditions. For instance, when different parts of a boiler installation are to be protected from overheating, such as the crown sheet, brick setting, or grates, the length and composition of member 15, weight of permanent magnet 17, and other variables may be selected to meet the different conditions. Thus, by setting the permanent magnet 17 at various positions beneath member 15, the temperature of the protected part, which will cause the permanent magnet 17 to drop, can be changed. It is apparent, from the foregoing, that my temperature actuated safety system may be put to a wide variety of uses. Thus, member 15 might be located in an air supply current and be made responsive to it, in addition to the protected boiler part. The burner 4 might be replaced by an oil or gasoline burner and the valve mechanism 5 could control the liquid fuel supply thereto. Or the switch 19 could operate a motor which might drive a stoker or powdered fuel installation, instead of the fuel supply mechanism 5. Many other arrangements can be used in applying my system without departing from the principles of operation thereof.

Referring now to Figure 2, the heated element 2 is here shown as a pan or vat adapted to contain liquid. So long as the level remains well above the bottom the temperature of this vat or pan remains substantially the same. The pan 2 is mounted in a suitable firebox or mounting 45, which contains the main burner 4 and the pilot burner 3. The main burner is supplied with gas from a bud 35 on the controlled side of the magnet valve 5. The pilot burner 3 is connected on the uncontrolled or gas pressure side of the magnet valve 5 so that it may receive at all times a supply of gas as above indicated. A heat conducting Curie point member or strip 46 is disposed in thermally coupled relation to the pot or pan 2, the coupling being close enough that so long as the liquid substantially covers the bottom of the pot the member 46 will remain at its outer end at a temperature below the Curie point of the material of which it is composed. A small permanent magnet 47, suitably guided in a guide 50 is suspended above the middle spring 49, of a switch 52. The magnet 47 has a suitable handle or raising member 48 by which it may be elevated so that it contacts with the strip 46 and is attracted thereto sufficiently to be suspended above the spring 49 of the switch. If, however, due to lowering of the level of the liquid in the pot 2 to the danger point, or the failure of the outer end of the bar 46 to be cooled normally the Curie point of the material will be passed and the ferromagnetic properties thereof dropped substantially to zero, whereupon the magnet 47 drops by gravity, depressing the spring 49 and opening the energizing circuit of the magnet valve 45, whereby the valve drops to its seat as described in connection with Figure 1, and the gas is shut off from the main burner.

The pilot burner likewise has its control which includes the bar 53, armature 54 and switch 55. The switch 55 is cut in series with the switch 52, so that if either switch is opened the magnetizing circuit for the magnet valve 5 is opened, and the switch thereupon closes. The magnet is normally adhering to the strip 53, being raised into the position by the handle 59 in the guide 57.

The strip 53 is made of a suitable Curie point material, so that when it is heated by the pilot burner 3, it loses its ferro-magnetic properties, whereby its shunting ability on the horse shoe magnet 58 is lost, and the free armature 54 may be attracted or suspended against the bottom of the Curie point strip 53, as shown in Figure 2. If, however, the pilot light goes out, the Curie point material of the strip 53 regains its ferromagnetic properties, acts as a shunt for the flux from the permanent horse shoe magnet 58 and thereupon the armature 54 is released, dropped upon the middle spring 56 of the switch 55, opening the energizing circuit of the magnet valve to allow it to close.

In connection with the switch 52 are provided a bottom spring cooperating with the middle spring 49 of the switch 52 to operate an alarm 59 when the level of the liquid in the pot 2 drops below the danger point. It is to be observed that the inner end of the strip 46 extends along the surface of the pot 2 above the bottom thereof, so that if the level of the liquid drops down, even though it does not uncover the bottom, nevertheless a danger point is reached where the fire should be shut off. The magnetic member 54 for the pilot 3 is preferably a bar of soft iron having no magnetic retentive properties.

Referring now to Figure 3, I have shown a member 60 subject to the heat of the burner 62.

A bar of Curie point material 63 is thermally coupled to the member 60 so that it receives heat in proportion to the temperature of the said member 60. The opposite end of the bar 63 is subjected to the cooling means 64 which is shown as a fan 65 and a shroud or housing 66 for maintaining the temperature of the right hand end of the bar 63 at substantially a definite value at all times. Intermediate the ends of the bar 63 I provide the suspended permanent magnet 67 working in the guide 68 and provided with a raising handle 69 by which it may be raised from its lower position to the position shown in the drawings. This guide 68 and the magnet 67 are mounted upon a slide 70 carried by a guide 72 upon the base 73. This slide carries the electric switch having the middle spring 74 located under the guide 68 so that the dropping of the permanent magnet 67 upon the said spring 74 switches the contact for any purpose desired, such as cutting off the supply of gas to the burner 62 indicating an alarm, admitting cooling medium to the heated member 60, or performing any other desired act in response to the temperature conditions above indicated.

In Figure 4, I have indicated a system for protecting a bearing 75 of a machine having a revolving shaft 76 in the bearing 75. A strip of Curie point material 77 is thermally coupled through the conductor 78 to the bearing at one end and it is thermally coupled to the conductor 79 to a heat receiving member 80, which is cooled by fluid flow in the conduit 82. The temperature of the strip therefore is subject to these two influences, and a point along the length of the strip 77 may be selected for the application of the permanent magnet 83, so that the ferromagnetic properties of the strip will be lost under predetermined conditions of temperature of the bearing 75. The permanent magnet 83 is guided in the guide 85 and is adapted to be raised as by means of a handle 84. This magnet 83 may drop onto a switch or other member which in turn governs either the operation of a shaft 76 or the development of heat therein, as, for example, by stopping the operation of the machine or introducing lubricant, or cooling medium or the like. In the present instance, I have shown a valve lever 86 in the path of the magnet 83, this valve lever 86 controlling a bleed valve 87 of the pressure motor 88, whereby upon dropping of the magnet 83, the valve 87 will be closed and fluid pressure from the source 89 will expand the motor member 87, causing it to make an outward stroke of the plunger 90 which is attached to the diaphragm of the motor.

In Figure 5 I have indicated a member 92 as subject to the development of heat, and variation of temperature thereof. The permanent magnet 93 has extensions 94 and 95 of the Curie point material thermally coupled to the member 92, and magnetically coupled to the magnet 93. So long as the temperature of the member 92 is below that which will heat the extensions 94 and 95 to a temperature below the Curie point of the members 94 and 95, the field of the magnet 93 will be sufficiently exerted upon the armature or bar 96 of magnetic material that the same will be maintained in elevated position.

If, however, the strips 94 and 95 are heated above the Curie point or sufficiently close to the same that the weight of the bar 96 can no longer be supported, said bar will drop upon the switch spring 97 and operate the circuit for the desired purpose, either of limiting the temperature of the member 92, giving an indication, or other useful act or indication.

In this construction, the bar 96 is ferro-magnetic, but of no substantial retentivity, being preferably merely a soft iron bar.

It is to be understood that the coupling between the heated member and the Curie point material may be loose or tight, that is to say, the coupling may be close or loose, as is well understood by those skilled in the art.

Where a permanent magnet has been referred to, it is to be understood that the invention is not to be avoided by the use of electromagnets.

In each case, the magnets and the Curie point and the cooling effects may be so arranged as to give the desired time interval of both response and delay in restoring.

Since certain further changes can be made in the foregoing, and different embodiments of the invention may be made without departing from the scope thereof, it is intended that all matters shown in the accompanying drawings or described hereinbefore shall be interpreted as illustrative, and not in a limiting sense.

I claim as my invention:

1. In combination, a strip of Curie point material thermally coupled to a member subject to heating, said strip extending to a point remote from the member and being adapted to dissipate heat, a permanent magnet attracted to and suspended by the strip so long as it is at a temperature substantially below its Curie point, said magnet dropping away from and being removed from the thermal and magnetic influence of the strip when the strip is heated to substantially its Curie point temperature and control means responsive to dropping of the magnet.

2. The combination of claim 1 wherein the control means comprises an electric switch.

3. A temperature responsive system comprising, in combination, an electrically operated fuel supply mechanism, a magnetically operated switch for controlling the electrically operated fuel supply mechanism, a source of magnetic flux for operating the magnetically operated switch, a heat conductor of Curie point material mounted on a body portion to be protected from overheating, and a movable permanent magnet constituting an additional flux source for operation of said magnetically operated switch upon movement of said permanent magnet, movement of said permanent magnet being controlled by the temperature of the body portion to be protected acting through the heat conductor of Curie point material mounted thereon.

4. A temperature actuated control mechanism comprising, in combination, a magnetically operated switch, a stationary source of magnetic flux for operating the magnetically operated switch, a flux conductor of Curie point material constituting a path for the magnetic flux between said source and said switch, the permeability of which conductor is controlled by heat conduction, a heat conductor of Curie point material, and a movable permanent magnet constituting an additional flux source for operation of said magnetically operated switch by movement of said permanent magnet, movement of the permanent magnet being controlled by the temperature condition and hence the ferromagnetic condition of the heat conductor of Curie point material.

5. A temperature actuated control mechanism comprising, in combination, a magnetic electric switch having a spring conductor carrying a magnetic armature, the spring holding the lower contact end of the spring conductor in contact with a pool of mercury when the magnetic armature is not sufficiently attracted to break the contact, a permanent horseshoe magnet constituting a source of flux for attracting the magnetic armature, a pole extension of Curie point material disposed adjacent to one of the poles of the permanent horseshoe magnet and spaced therefrom by an air gap, constituting a path for the flux from said adjacent pole, a heat conductor of Curie point material spaced above the other pole of the permanent horseshoe magnet, and a permanent bar magnet disposed in a guide for intermovement between the heat conductor of Curie point material and said other pole of the permanent horseshoe magnet, the adjacent poles of the permanent bar magnet and the permanent horseshoe magnet being of similar polarity.

6. A temperature actuated control mechanism comprising, in combination, a magnetic electric switch having a spring conductor carrying a magnetic armature, the spring holding the lower contact end of the spring conductor in contact with a pool of mercury when the magnetic armature is not sufficiently attracted to break the contact, a permanent horseshoe magnet constituting a source of flux for attracting the magnetic armature, a heat conductor of Curie point material spaced above one of the poles of the permanent horseshoe magnet, and a permanent bar magnet disposed in a guide for intermovement between the heat conductor of Curie point material and the pole of the permanent horseshoe magnet, the adjacent poles of the permanent bar magnet and the permanent horseshoe being of similar polarity.

7. A safety system responsive to separate temperature factors comprising, in combination, a magnetic switch, a source of flux for operating said magnetic switch, a flux conductor of Curie point material constituting a path for the magnetic flux from said source to said switch to control operation thereof, said flux conductor being disposed in thermal conductive relationship to one temperature factor, a heat conductor of Curie point material thermally responsive to a second temperature factor, and a movable permanent magnet constituting an additional flux source for operating said magnetic switch upon movement of said permanent magnet, movement of the permanent magnet being controlled by the temperature condition of said heat conductor of Curie point material.

8. A safety system responsive to a pilot flame for a main burner and the temperature of a body heated by the main burner comprising, in combination, a magnetic switch, a magnet constituting a flux source for operating said magnetic switch, a flux conductor of Curie point material constituting a controllable path for the operating flux from said magnet and in thermal conductive relationship with said pilot flame, a heat conductor of Curie material thermally responsive to the temperature of said body heated by the main burner, and a permanent magnet suspended from said heat conductor when at a temperature below its Curie point and adapted to drop to a position for operating said magnetic switch when said heat conductor is at a temperature above its Curie point, the flux from said magnet or said permanent magnet each being sufficient to operate said magnetic switch.

9. A readily adjustable thermostat responsive to the temperature of a heated body to which it is adapted to be applied comprising, in combination, an element of Curie point material adapted to be thermally coupled to said body, said element being adapted to dissipate heat, a permanent magnet attracted to and suspended from a desired spot along the Curie point element when said spot is below its Curie point and ferromagnetic, and means responsive to dropping of the magnet when the spot to which it is attracted exceeds its Curie point, said thermostat being adjusted by locating said permanent magnet at different spots along said Curie point element, said spots being at different temperatures depending on their distance from the body to which said Curie point element is adapted to be attached.

10. In combination, a stationary strip of Curie point material extending from a member subject to heating, one end of the strip being adapted to be thermally coupled to said member, the other end of said strip being disposed in a medium of a lower temperature than the Curie point, whereby said latter end is capable of dissipating heat, a permanent magnet normally attracted to and suspended from the strip at a point remote from said first named end, said magnet being adapted to drop and remove itself from the thermal influence of the strip upon heating of the adjacent part of the strip above the Curie point temperature, and a control element responsive to dropping of said magnet.

11. The combination of claim 10 with a guide disposed vertically for guiding the magnet, and a projection on the magnet for manually raising the magnet into contact with the strip.

12. In combination a stationary strip of Curie point metal, heating means in thermal contact with one part of the strip for heating a remote part of the strip to substantially its Curie point temperature, said remote part of the strip being disposed in thermal contact with a medium which is at a temperature substantially below the Curie point whereby the strip tends to vary in temperature with variations in temperature of the heating means, a permanent magnet adapted to be attracted to and suspended from said strip, a guide for guiding the magnet in substantially a vertical direction, control means disposed below the magnet and adapted to be actuated by dropping of the magnet thereupon, and manual means for raising the magnet from the control means to said strip.

13. In combination with a gas burner having a pilot, a normally closed magnetically operated gas supply valve controlling the supply of gas to the burner, a liquid containing vessel heated by the burner, a control circuit normally closed for holding said magnetically operated valve open, switching means for opening the circuit when either the vessel is heated to a dangerous temperature or the pilot goes out, said means comprising a pilot responsive element for controlling said switching means, said element including a permanent magnet and a cooperating bar of Curie point metal disposed to be heated by the pilot flame to a temperature above the Curie point to prevent opening of the circuit, and a second element responsive to overheating of the vessel, said second element comprising a bar of Curie point material one part of which is fixed in thermal conductive relation to the walls of the vessel and another part is disposed in the air for the dissipation of heat therefrom to keep the bar below the Curie point temperature when the walls of the vessel are not overheated, and means including a second permanent magnet cooperating with said second bar when the latter bar is below the Curie point temperature to prevent opening of said circuit, heating of said second bar to a temperature above its Curie point permitting said means to open the circuit.

14. A safety control system for shutting off the fuel to a burner when the pilot thereof is extinguished or the temperature of a device heated by the burner reaches a dangerous value which comprises the combination of a control circuit governing the supply of fuel to the burner, switching means for the circuit, a heat controlled element responsive to the pilot, said element comprising a permanent magnet, and a cooperating bar of Curie point metal normally heated by the pilot flame to a temperature above the Curie point to prevent the said magnet from operating the switching means to open the circuit, and a heat controlled element responsive to the temperature of the heated device, said second element comprising a second permanent magnet having a field and operating means responsive to shifting of the field for operating the switching means to open the circuit and a cooperating bar of Curie point metal in thermally conductive relation to the heated device and being normally at a temperature below the Curie point for controlling the field of said second magnet, whereby said operating means is prevented from operating the switching device to open the circuit, heating of the second strip of Curie point material to a temperature above its Curie point shifting the field of said second magnet to permit said operating means to operate the switching means to open the circuit.

ROBERT A. WITTMANN.